May 4, 1937. W. A. MORTON ET AL 2,079,560
RECUPERATIVE SOAKING PIT FURNACE
Original Filed Feb. 14, 1934    12 Sheets-Sheet 8

Fig.11.

INVENTORS
William A. Morton
Howard F. Spencer
William B. Jaspert
BY
ATTORNEY

May 4, 1937.　　W. A. MORTON ET AL　　2,079,560
RECUPERATIVE SOAKING PIT FURNACE
Original Filed Feb. 14, 1934　　12 Sheets-Sheet 9

INVENTORS
William A. Morton
BY Howard F. Spencer
William B. Jaspert
ATTORNEY

Patented May 4, 1937

2,079,560

UNITED STATES PATENT OFFICE 2,079,560

RECUPERATIVE SOAKING PIT FURNACE

William A. Morton and Howard F. Spencer, Pittsburgh, Pa., assignors to Amco, Incorporated, Pittsburgh, Pa., a corporation of Pennsylvania Application February 14, 1934, Serial No. 711,166
Renewed July 23, 1936

26 Claims. (Cl. 263—15)

This invention relates to pit furnaces of the recuperative type for the reheating of ingots to rolling temperatures after they are stripped from their molds, and it is among the objects thereof to provide a pit furnace in which the ingots are arranged and the combustion gases introduced in a manner to simultaneously and uniformly heat a maximum number of ingots with a minimum input of fuel. This application contains matter related to applicants' copending application Serial No. 733,812 filed July 5, 1934 for a Recuperative soaking pit furnace.

Another object of the invention is the provision of a pit furnace in which the ingots are arranged to form a combustion chamber between the ingot walls.

Another object of the invention is the provision of a pit furnace in which the combustion gases are introduced vertically into the combustion chamber.

A further object of the invention is the provision of a pit furnace in which the combustion gases are introduced into and the products of combustion withdrawn from the bottom of the furnace.

Still a further object of the invention is the construction of a furnace in which the combustible gases are introduced vertically into the center of a plurality of spaced ingots and in which the products of combustion are removed through spaced outlets at substantially the bottom of the furnace.

Still a further object of the invention is the construction of a pit furnace in which a mixing chamber for air and gas is provided below the hearth of the pit and in which the combustible mixture is directed vertically through a firing port at substantially the center of the furnace.

These and other objects of the invention will become more apparent from a consideration of the accompanying drawings constituting a part hereof in which like reference characters designate like parts and in which.

Figures 1, 2:
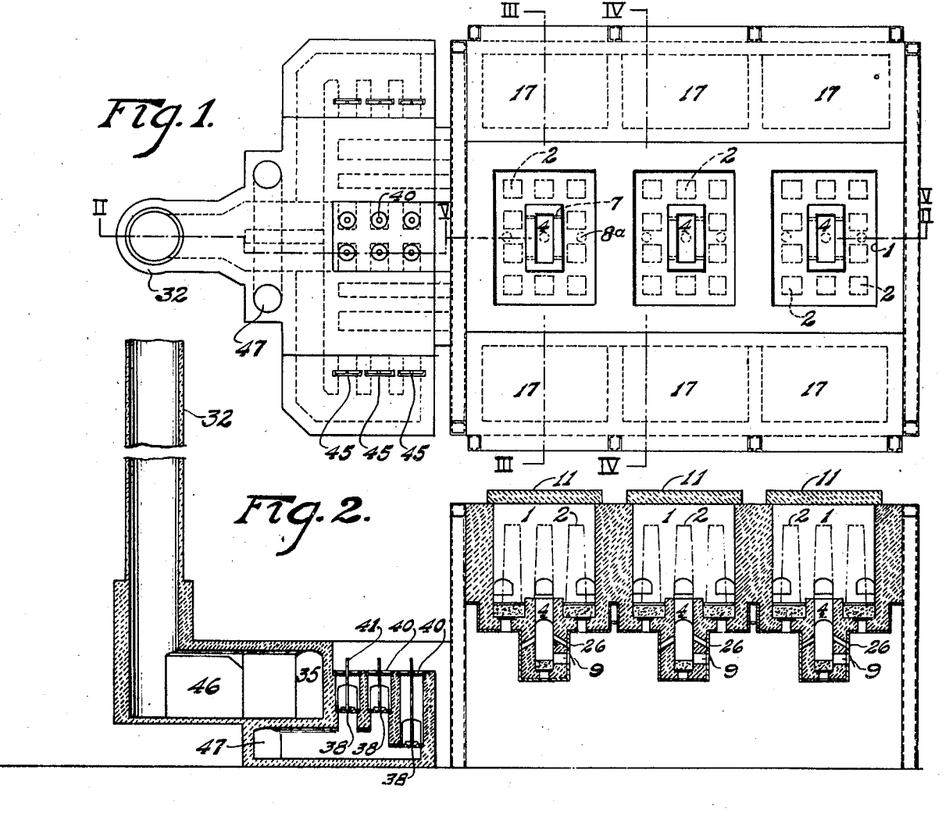
Figure 1 is a top plan view of a continuous recuperative soaking pit furnace.
Figure 2 a vertical section taken along the line II—II, Figure 1.
Figure 3:
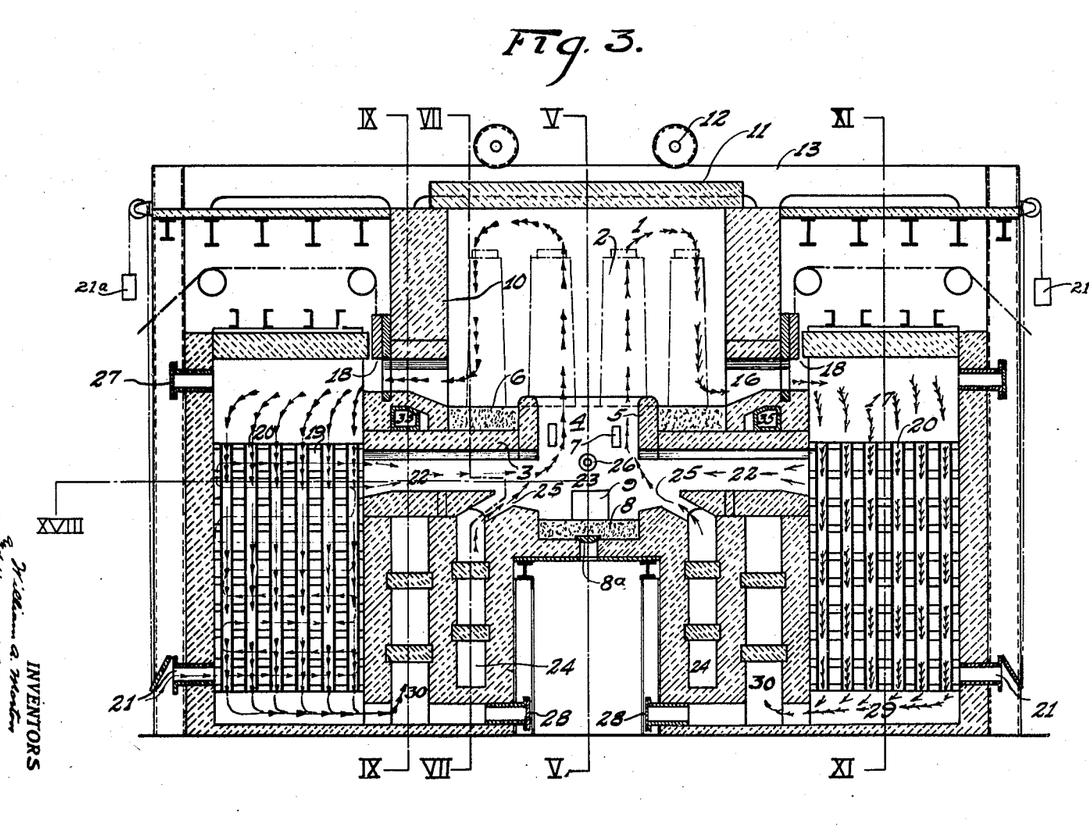
Figure 3 a vertical section taken on the line III—III, Figure 1.
Figure 4:
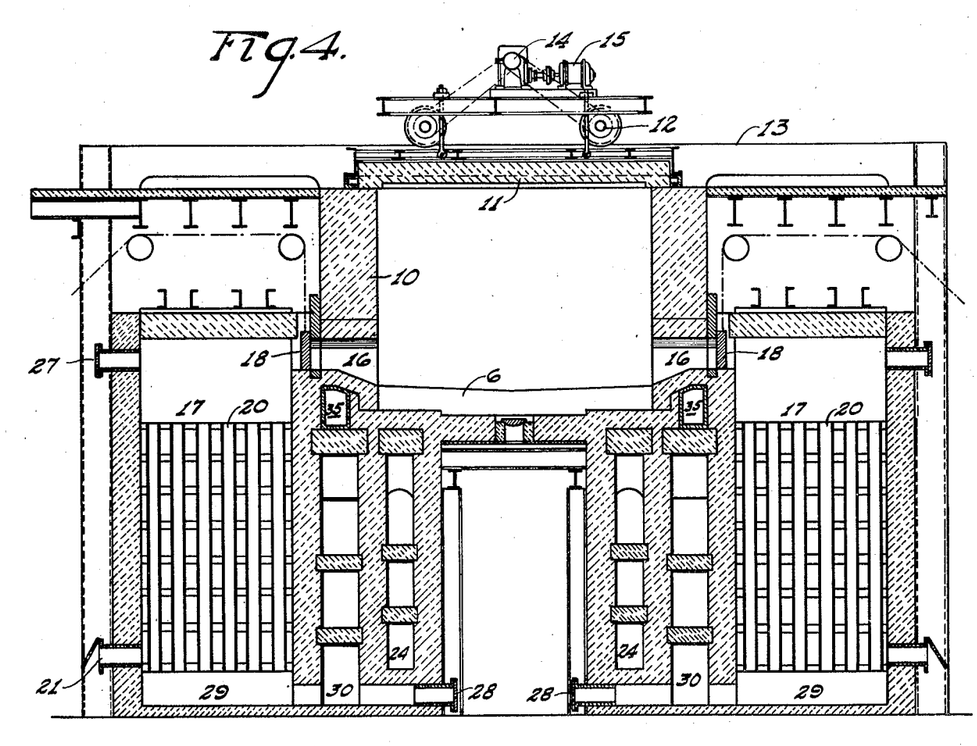
Figure 4 a vertical section taken on the line IV—IV, Figure 1.
Figures 12, 15:
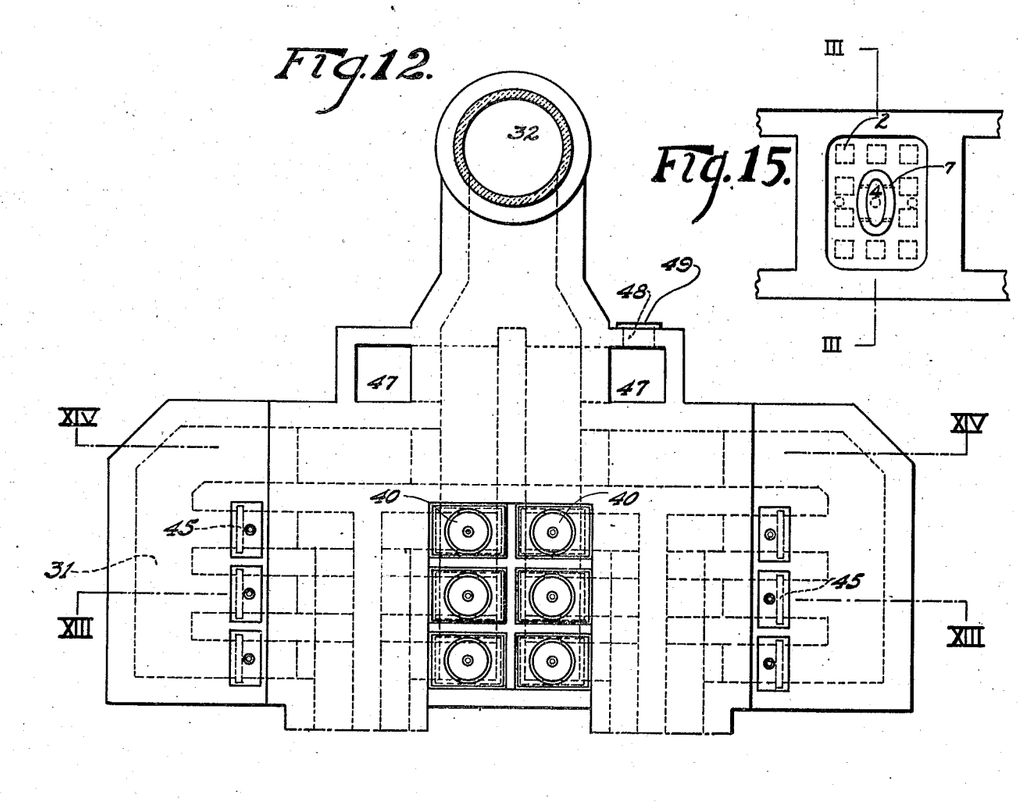
Figure 12 a top plan view of the stack end of the furnace showing the valve arrangement of the air and gas passages.
Figure 15 a reduced top plan view of a portion of a pit furnace as shown in Figure 1, illustrating an oval shaped firing port.

The structure will be first briefly explained in connection with Figures 1, 2 and 3 of the drawings. As shown in Figure 3, the reference numeral 1 generally designates a pit furnace in which a plurality of ingots 2 are seated on a hearth 3 in spaced relation as is more clearly shown in Figure 1, the ingots being disposed around a firing port 4 projecting centrally of the pit furnace 1, the wall 5 of the port 4 extending above a bed of coke breeze designated by the numeral 6. Grooves 7 are provided in the hearth 3 for draining any molten metal that may accumulate on the hearth surface into a pit 8, an outlet 8a being provided for removing the slag and clearing the pit. A cleaning door 9 is also provided for removing the accumulated material from the bottom of the firing port. The pit is constructed of suitable refractory walls 10 and may be of rectangular form as shown in Figure 1 or may be otherwise shaped such as round or oval if desired as shown in Figure 15. A cover 11 of refractory material is adapted to close the pit after the ingots are charged therein, the cover being supported on wheeled axles 12 that operate on rails 13 provided above the pit furnace, the movements of the cover 11 being effected by a drive mechanism 14 operated by a motor 15 shown in Figure 4 of the drawings. Opposite walls of the pit furnace are provided with exit passages 16 to draw off waste gases to recuperator structures generally designated by numerals 17, the passages 16 being controlled by dampers 18 to regulate the withdrawal of the products of combustion from opposite walls of the furnace. The recuperators 17 are of the usual tile construction, the tile 19 forming vertical waste gas passages 20 and transverse air passages leading to inlets 21, the air entering at the bottom of the tile structure and passing transversely across the tile in an upward direction absorbing the waste heat of the products of combustion passing through the tile until in its preheated condition it passes into ports 22 leading to a combustion chamber 23 beneath the firing port 4. Combustible gas such as producer gas is supplied through passages 24 and enter the combustion chamber 23 through ports 25, the combustible gas co-minging with the preheated air of ports 22 and becoming thoroughly mixed in the mixing chamber 23, thence passing vertically upward through the firing port 4 into the pit furnace.

Burner ports 26 may be provided in the mixing chamber 23 to use low B. t. u. gases such as blast furnace gases which, with the high preheat of the recuperator, can be utilized for efficient heating at low cost.

Clean-out openings 27 are provided in the recuperator wall to clean out the waste gas passages 16 leading to the recuperators, and clean-out openings 28 are provided to clean out the slag or other foreign materials accumulated from pits 29 at the bottom of the recuperator tile through which the waste gases pass to flues 30 leading to the gallery 31, Figure 2, communicating with the stack 32.

The structure described in connection with Figure 3 is shown in multiples in Figures 1 and 2 in which three pit furnaces and their recuperator structures are shown.

Figure 5:
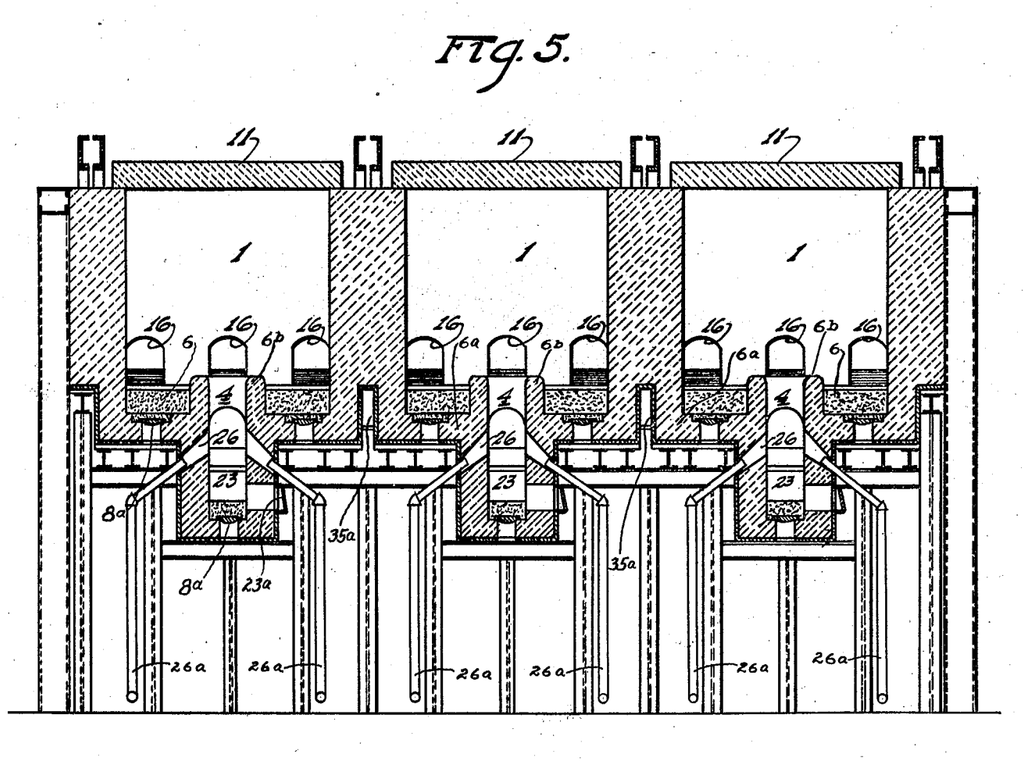
Figure 5 a vertical section taken on the line V—V, Figures 1 and 3.

Figure 5 is a vertical section taken transversely of the section of Figure 3 along the line V—V of Figure 3 which is the center line and this view clearly illustrates the gas exit passages 16 and the burner ports 26 for the blast furnace gases. It also illustrates the frame structure on which the pit furnaces are supported.

Figure 11:
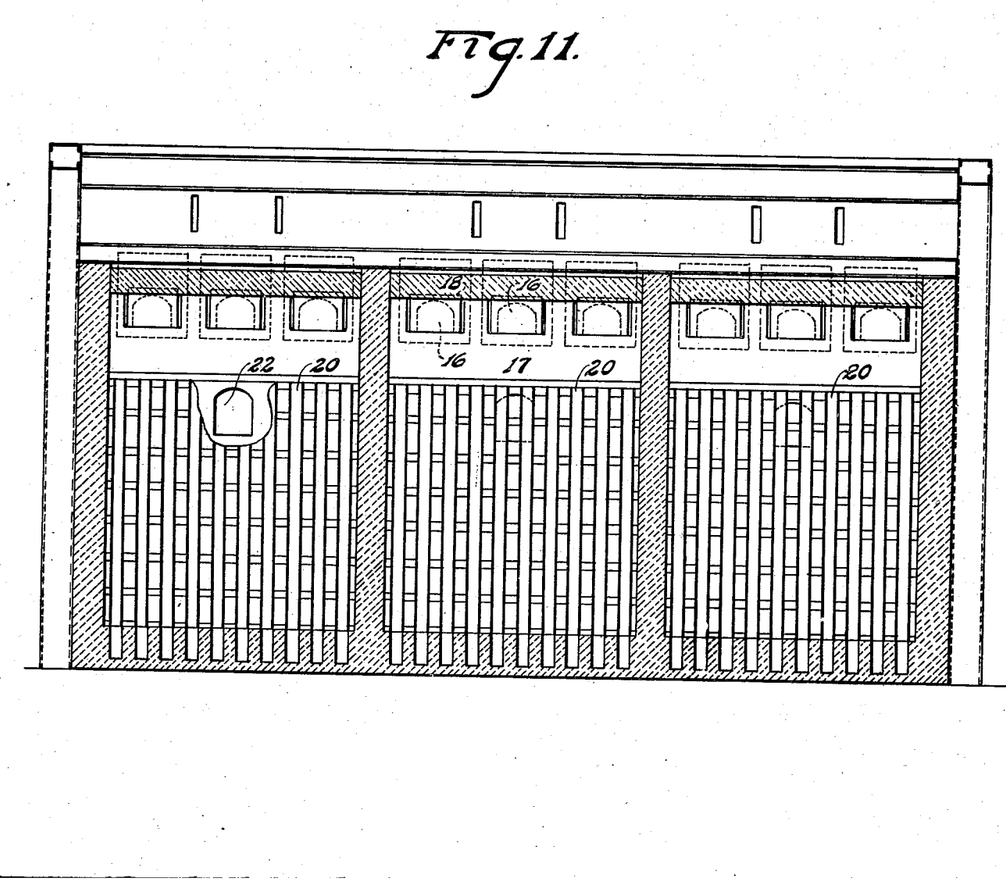
Figure 11 a vertical section taken on the line II—II, Figure 3.

Figure 11 is a vertical section taken on the line XI—XI, Figure 3, which is through the center of the recuperators, this view showing the gas exits 16, their controlling dampers 18 and the preheated air ports 22, and generally illustrates the nature of the recuperator structure.

Figure 9:
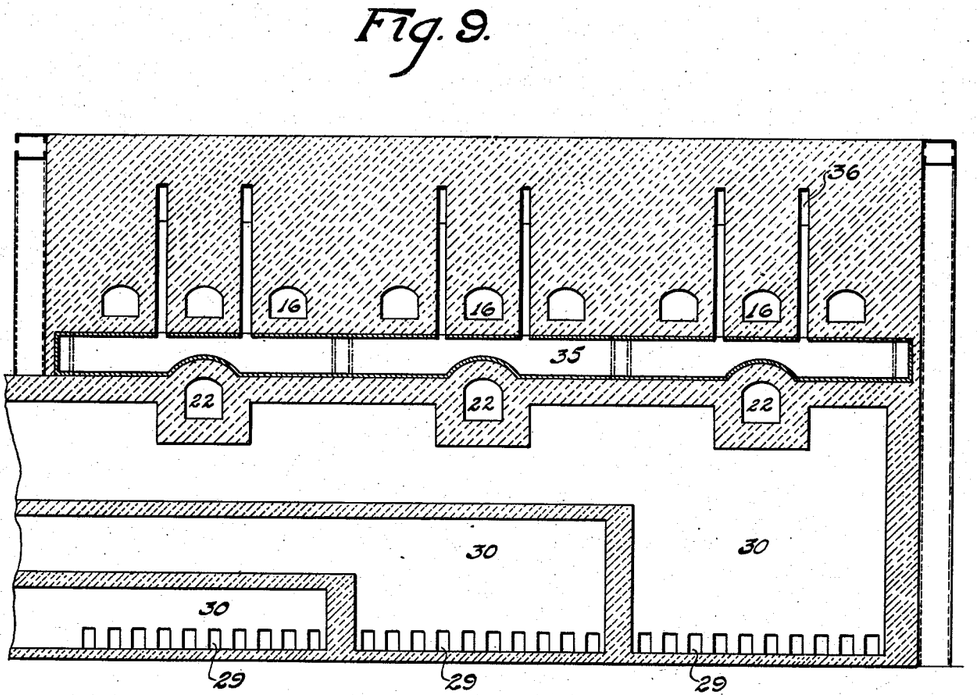
Figure 9 a vertical section taken on the line IX—IX, Figure 3.
Figure 10:
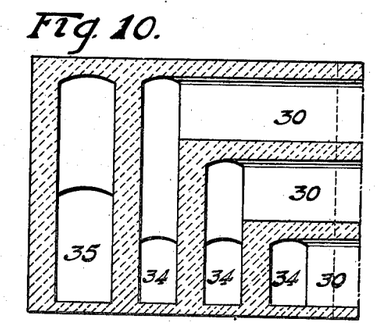
Figure 10 a vertical section forming an extension of Figure 9.

Figure 9 is a vertical section taken through the passages of the waste gases after they leave the recuperators 17, this view and its extension, Figure 10, being taken on the line IX—IX Figure 3. These views show the passages 29 at the bottom of the recuperator communicating with passages 30 which in Figure 12 are shown leading to passages 34 having a common connection with the gallery 31 leading to the exhaust stack 32. Figure 9 also shows the preheated air ports 22, the waste gas exits 16, and a cooling flue 35 through which a cooling blast is conducted by passages 36.

Figure 6:
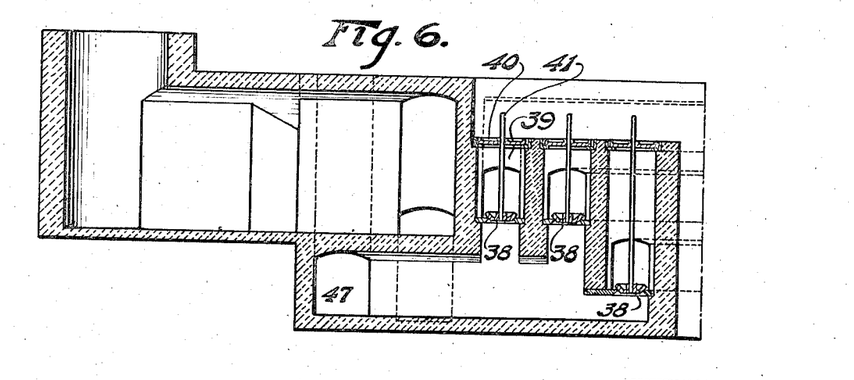
Figure 6 a vertical section which is an extension of Figure 5.
Figure 7:
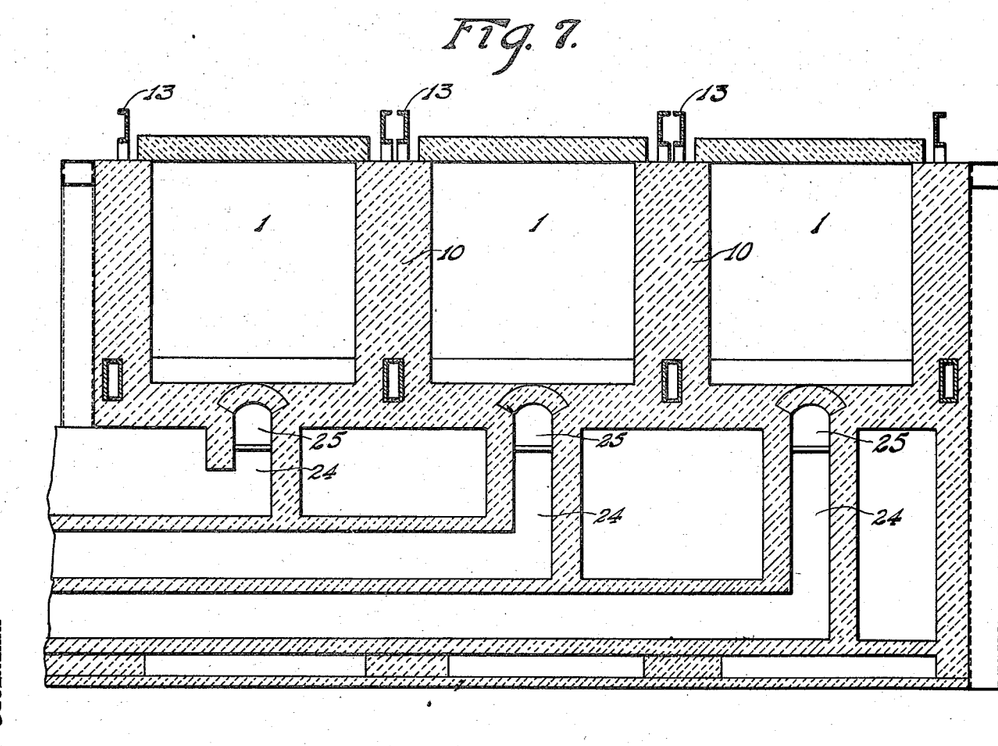
Figure 7 a vertical section taken on the line VII—VII, Figure 3.
Figure 8:
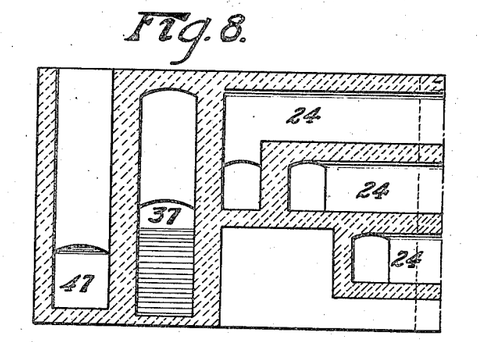
Figure 8 a vertical section forming an extension of the section shown in Figure 7.
Figure 13:
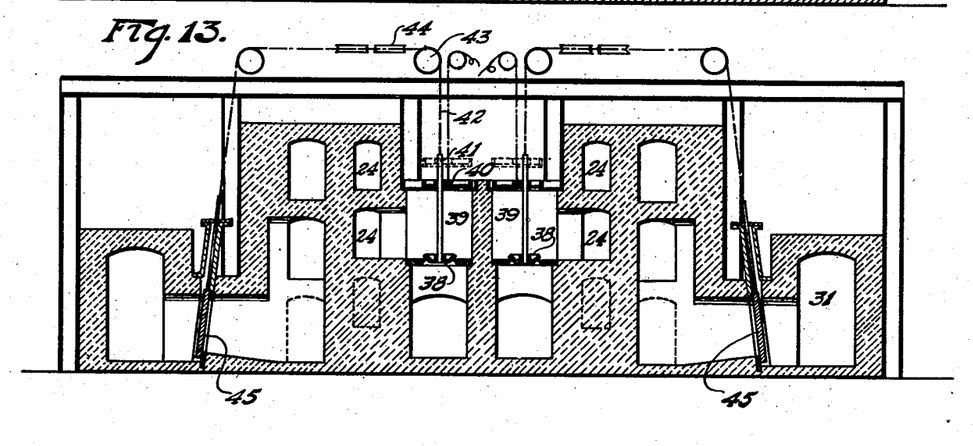
Figures 13 and 14 vertical sections taken on the lines XIII—XIII and XIV—XIV respectively of Figure 12.
Figure 14:
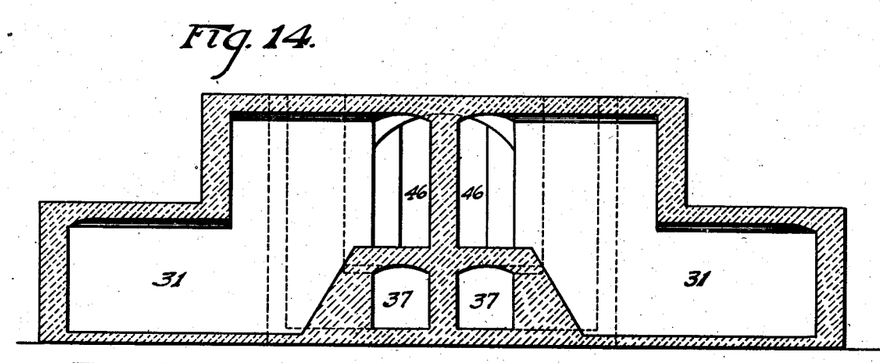

Figure 7 is a vertical section through the combustible gas passages 24 taken along the line VII—VII of Figure 3, there being a passage and port 25 for each pit furnace, the extension of Figure 7 being shown in Figure 8 wherein the gas passages 24 communicate with a common gas main 37 from which the gas is distributed to passages 24 by means of control valves 38 shown in section in Figure 6 of the drawings. The valve chambers 39 are provided with removable covers 40 through which valve stems 41 project, valve stems 41 being operable by cables 42 passing over sheave wheels 43 and 44 as shown in Figure 13, this view also showing dampers 45 for controlling a flow of waste gas from the passages 31 to the main, passages 46 leading to the stack 32, the arrangement of gas valves 38 and dampers 45 of Figure 13 being shown in a top plan view of Figure 12 which also shows the combustible gas passages 47 for the producer gas, there being one passage 47 on each side of the stack 32 for each set of recuperators on the sides of the pit furnaces. Passages 47 are provided with air inlet passages 48 provided with doors 49 for purpose to be hereinafter explained.

Figure 15 shows a modification of the shape of the burner port in the hearth, this curved form being preferred to give the port walls additional strength to maintain a more uniform area and resist loading of the hearth and expansion and contraction.

Figure 16:
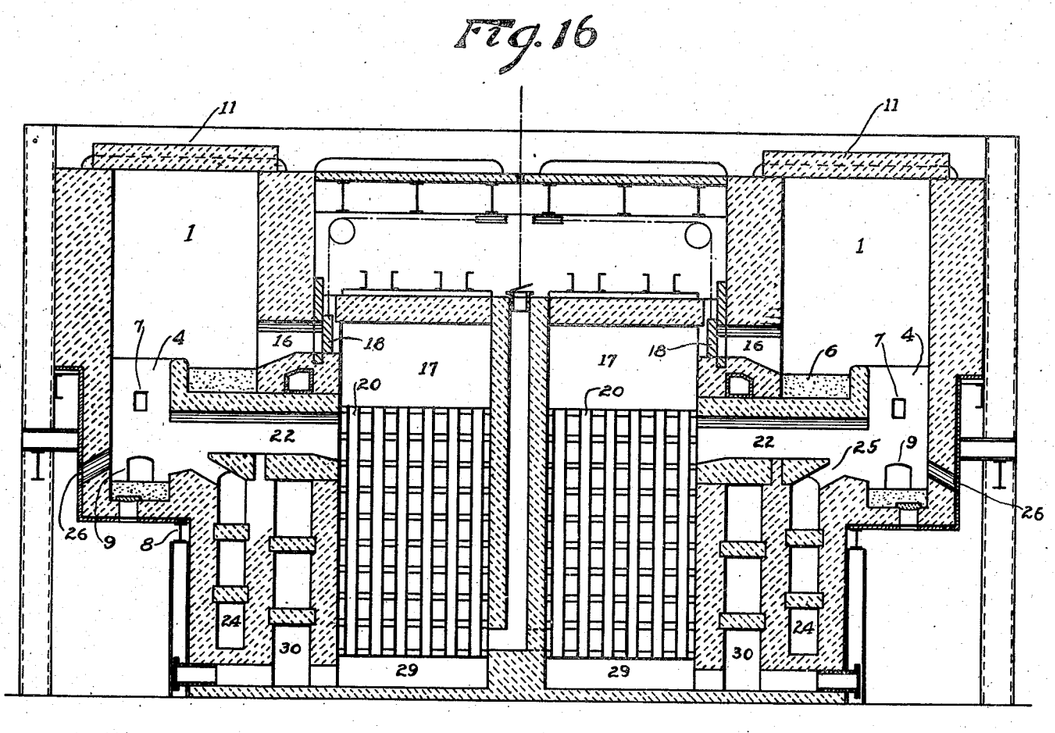
Figure 16 a vertical section showing a modification of the recuperator structure of Figure 3.

The structure shown in Figure 16 is identical with that disclosed in Figure 3 with the exception that the structure of Figure 3 is cut through the center line, and the half sections are disposed back to back with their recuperator structures forming adjacent members so that what would be a single pit furnace in Figure 3 of the drawings for example is made two separate pit furnaces separably operable through their recuperator and burner port structures.

The structure of Figure 16 would be operable in the same manner as that of Figure 3 in that the combustible gases are directed vertically upward from the bottom or hearth of the pit and the products of combustion are withdrawn horizontally adjacent the bottom of the pit to the waste gas flues 16.

The operation of the above described pit furnace is briefly as follows:

Groups of pit furnaces such as shown in Figures 1 and 2 illustrating three pit furnaces may be operated individually or in separately controlled multiples of any number. The ingots after they are stripped are charged into the respective pit furnaces in such manner that they are disposed around the firing ports 4 in the bottom of the pits, the ports being shown as of rectangular construction in Figure 1, although they may be of any desired shape or such as shown in Figure 15.

When the pits are charged, air and gas are conducted through their respective ports 22 and 25 into the mixing chamber 23 where the combustible mixture is accumulated and the resultant flame passes through the firing port 4 vertically upward into the pit furnace and into the combustion chamber between the walls of the spaced ingots.

The gases then pass vertically upward with the initial flame substantially out of contact with the ingot walls, the flame and products of combustion being deflected by the cover 11, the gases then are diffused and the denser products of combustion drop over the entire area of the space surrounding the ingots with the resultant products of combustion passing to the exit ports 16 in opposite walls of the pit furnace through which they travel to the recuperator structures on the respective sides of the furnace, thence downwardly through the recuperator passages 20, the bottom passages 29, and thence through passages 30, Figure 9, passages 34, Figure 10, to the waste gas passage 46 to the stack 32, the flow of the waste gases being controlled by dampers 18, Figure 3, and dampers 45, Figure 13. Dampers 18 regulate the flow of waste gases from the respective sides of the pit furnaces whereby the temperature along the side walls of the ingots may be regulated, and the main dampers 45 control the withdrawal of gases from the recuperators, there being individual valves 18 for the three exit ports on each wall of the pit furnaces. The heat is further controlled by regulation of the preheated air passing into ports 22 and the combustible gases in ports 25 and 26, the gases being controlled by valves 38 and the air through the air inlet passages 21. By separately regulating the fuel and air supply on each side of the mixing chamber 23, the character of the flame and the heat of the furnace is positively controlled, and by controlling dampers 18 and 47 the heat distribution within the furnace may be positively controlled.

The circulation of the producer gases, the preheated air, the combustible gases and the products of combustion are illustrated by arrows in Figure 3 of the drawings, the single arrow designating the preheated air; the double arrows, producer gas; triple arrows, combustible gas; and quadruple arrows, the products of combustion.

By the double firing of the pit furnaces, possible regulation of the furnace temperatures can be maintained, and by directing the heat through the center of the furnace in a vertical direction within the combustion chamber constituted by the walls of the ingots per se, the latter are subjected to the most efficient heating conditions as the heating medium completely envelops the ingots and is at its hottest point when entering the furnace which is near the base of the ingots, thus eliminating the overheating of the top of the ingots reducing scaling or oxidation by avoiding direct impingement of the flame on the steel. By thus avoiding direct impingement of the initial flame on the walls of the ingots, fusion of the scale with the body of the ingot is eliminated, and upon subsequent rolling of the ingots in the mill, the scale drops off. The indirect firing with the initial flame out of contact with the ingots, the spacing of the ingots on the furnace hearth to provide combustion spaces between adjacent ingots to expose a maximum of the ingot walls to the initial heat entering the furnace, and the circulation of the products of combustion over a maximum wall area of the ingots to envelope the ingots in the heating medium, makes possible a lower average temperature condition throughout the heating cycle, or in other words produces a minimum temperature differential between the heating medium and the ultimate ingot temperature. On account of the high preheat available by the use of the recuperators of the construction herein disclosed, gases of low B. t. u. such as blast furnace gases may be consumed which renders the heating of ingots by this fuel a more desirable, efficient and economical operation.

Figure 17:
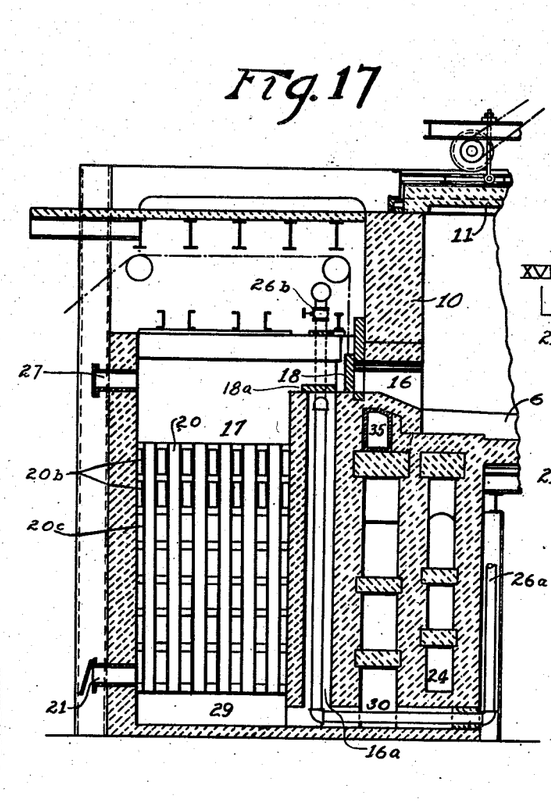
Figure 17 a vertical half section of a modified recuperator structure taken on the line XVII, Figure 18.
Figure 18:
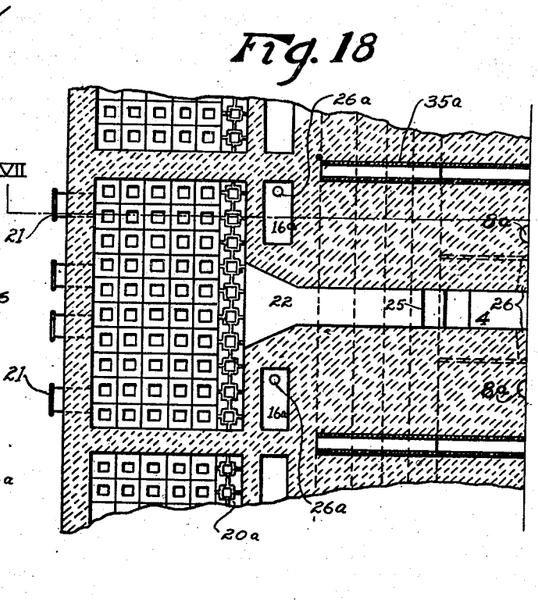
Figure 18 a horizontal cross-section of Figure 17 taken on the line XVIII, Figure 3.

An arrangement for utilizing blast furnace or other less expensive fuel is shown in Figures 17 and 18 of the drawings in which a by-pass 16a is provided for a desired portion of the waste gases to avoid passing them through the recuperator. The by-pass 16a is controlled by dampers 18a which may be manipulated as required through openings 27. The object is to provide means for maintaining a desired temperature differential between the cold air to be preheated and the waste gas, the quantities of which vary widely for different fuels when alternated for the same purpose. By means of this by-pass we avoid setting up undue stresses in the tile in the recuperator which would cause rupture and require immediate repairs and the loss of production from the pit. This structure permits the use of blast furnace gas alone or in combination with the other richer fuels to obtain higher flame temperatures, without jeopardizing the tile by eliminating excessive temperature differences by by-passing a portion of the surplus waste gas.

High air preheat temperatures are obtained by utilizing special refractory tile construction such as those composed of alumina silicates in the recuperator. These provide high preheat temperatures, about 300° F. above the limit of clay tile and produce higher flame temperatures than would otherwise be possible in an ordinary recuperator because the material used is non-porous and a better conductor of heat and therefore when used in pit furnaces makes possible the substitution of blast furnace gas in a service for which other richer fuels are now obligatory. This results in economy not now possible with an ordinary refractory recuperator.

In Figures 17 and 18 pipes 26a for conducting the blast furnace gas are shown in the excess waste gas by-pass flues 16a which are associated with the recuperator, but may be located in any other practical position of any form or desired heating surface. In this manner the surplus waste gas, which is not required for heating the required air for combustion to the same temperature as though all the gas were passed through the recuperator, is used to preheat the gas and lend to the combustion of the air and the gas, greater flexibility as to flame temperature range. In Figure 5 these pipes are shown connected to the burner blocks in the port as they would be arranged in full accord with the preferred modification provisions of Figures 17 and 18.

The results to be attained by the improved pit furnace especially in the design of Figures 17 and 18 adapted to either raw hot-producer gas or blast furnace gas, or dual firing of the two in a desired percentage to attain the best flame temperature conditions, are shown by the following figures which indicate the necessity for the by-passing of a quantity of the waste gas. Using producer gas alone as fuel, the ratio of air required to waste gas is approximately 7.1 to 12.43; using blast furnace gas alone, the ratio is about 7.17 to 16.1. The ratio of fuel volumes for the two gases is about 6 to 10.4 being raw gas and blast furnace gas respectively. It is evident from the foregoing that there is a surplus of waste gases from the combustion of blast furnace gas when substituted in a furnace for a richer fuel in the same furnace operating at like temperatures, performing the same work.

It follows further that the blast furnace gases can be preheated to virtually the same temperature as the air, because we find we have almost equal quantities of waste gas passing through the heat exchanger and the by-pass recuperator flues thru which we pass the gas in suitable heat resistant alloy pipes, or the equivalent, prior to delivery to the burner ports 26.

Figures 17 and 18 show the arrangement of the pit and heat exchanger modification with the by-pass flues 16a for waste gas on top of which is shown cover 18a which may close the flues entirely when the pit is operated on a rich fuel.

The authority Haslem and Russell in their treatise on combustion give the following formula for the determination of theoretical flame temperature. Actual = 85% of that value.

$$\frac{\text{Heat of combustion} + \text{sensible heat in fuel} + \text{sensible heat in air}}{\text{(Total quantity of combustion products)} \times \text{(their mean specific heats)}}$$

Using this formula it is determinable that the actual temperature of the flame with preheated air at 1600° F. and cold blast furnace gas is 2680° F. However, by using very dense tile in the upper part of the recuperator designated as 20b, it is possible to preheat the air to approximately 1900° F. in this practice and the flame temperature then becomes 2745° F. This temperature would be satisfactory for a furnace of this character but as these units age they become somewhat less efficient, therefore, there should be a greater factor of safety, and a higher ultimate flame temperature is desirable. With the by-pass gas preheater arrangement for a furnace using blast furnace gas, this gas can be preheated without diminishing the air preheat temperature. Using air at 1900° F. and blast furnace gas at 1300° F., a flame temperature of 3245° F. is obtainable.

One of the features of the present type of pit furnace is that of cleaning the combustible gas passages by the admission of air into the gas mains 47 through the air inlets 48 shown in Figure 12 of the drawings. By admitting air into the gas passages 26 all of the carbon deposits incidental to the use of producer gas are burned out of the gas flues or passages and this without interrupting the operation of the furnaces since one side of the furnace may be shut down for cleaning without interfering with the firing of the pit furnaces through the other combustion units.

The following features are made the subject matter of our copending applications. Serial No. 733,812 filed July 5, 1934, claims certain features of the furnace temperature controls not claimed in the present application; Serial No. 32,534 filed July 22, 1935 claims a furnace cover and cover lifting and traversing mechanism; and Serial No. 47,254 filed October 29, 1935 claims the relation of the furnace closure and furnace sealing means.

We claim:

1. The method of heating steel ingots in a soaking pit furnace which comprises, standing the ingots spaced from the vertical walls of the furnace to form a combustion chamber of substantial width between the ingots, introducing a heating medium from the bottom of the chamber at substantially the center thereof, causing said heat to flow in a vertical path to the top of the chamber and subsequently causing the said heat to return in a path substantially parallel to the first named path to the bottom of the chamber.

2. The method of heating steel ingots which comprises, assembling a plurality of ingots on the hearth of a soaking pit in an upright position, adjacent ingots forming a wall of a combustion space and directing a heating medium into the furnace chamber on one side of said ingots coaxially therewith, and then directing the heating medium to the opposite sides of said ingots in a path substantially parallel to the wall of said ingots to simultaneously uniformly heat all of said ingots.

3. The method of heating steel ingots which comprises, assembling a plurality of ingots on the hearth of a soaking pit in an upright position, adjacent ingots forming the walls of a combustion space and directing a heating medium at the center of said space from the bottom of the pit to the top of the ingots coaxially therewith on one side thereof, thence in a downward direction on the opposite sides of said ingots to continuously envelop their entire surfaces with said heating medium.

4. The method of heating steel ingots which comprises assembling a plurality of ingots on the hearth of a soaking pit in spaced relation to expose their surfaces, directing a heating medium from the center at the bottom to the top of said pit, and causing the heat to diffuse and the products of combustion to drop over the entire area of the space surrounding said ingots.

5. The method of heating steel ingots which comprises assembling a plurality of ingots on the hearth of a soaking pit in spaced relation to expose their surfaces, directing a heat flame from the center at the bottom to the top of said pit, and removing the products of combustion at intervals from the bottom of the pit chamber.

6. The method of heating steel ingots which comprises assembling a plurality of ingots on the hearth of a soaking pit in spaced relation to expose their surfaces introducing gaseous fuel vertically upward into the pit chamber from the center thereof between the walls of said ingots, and removing the products of combustion in a vertical downward stream from said pit at the bottom thereof.

7. In a pit furnace embodying in combination a heating chamber, a recuperator structure, a fuel mixing chamber, waste gas passages for directing the products of combustion from the furnace chamber to the recuperator structure, passages for directing the preheated air to the combustion chamber, means for burning richer or leaner fuels separately or in combination comprising a by-pass for the gas passages around the recuperator structure with regulable means controlling the volume of the gases flowing therethrough, and conduit means adapted to extend through said by-pass for directing the leaner fuel gases to the fuel mixing chamber.

8. In an industrial heating furnace, a furnace chamber, a fuel mixing chamber, a recuperator structure, gas passages opening into said mixing chamber communicating with a source of rich fuel, and gas passages opening into said mixing chamber leading to a source of leaner fuel, waste gas passages for directing the products of combustion from the furnace chamber to the recuperator structure, means for by-passing a quantity of the products of combustion around the recuperator structure, and regulable means controlling the volume of gases flowing to the by-pass, the last named gas passages of the mixing chamber having conduit connections extending through the recuperator waste gas by-pass to preheat the gases delivered to the mixing chamber.

9. A pit furnace for heating steel ingots, said furnace embodying a hearth, side wall and roof structure for receiving ingots of substantial length, the ingots resting in spaced relation on their ends upon the hearth of the furnace chamber, said chamber having passages for supplying combustible fuel mixtures to the furnace chamber at one end of the ingots and for withdrawing the products of combustion at the same end of the ingots, said passages being in spaced relation to obtain a directional distribution of the products of combustion to cause a substantial portion of the heating medium to pass from the fuel supply source between the bottom and top of the heating chamber on opposite sides of the spaced ingots, whereby to envelop the ingots in the heating environment, and regulable means controlling the flow of the gases through the said supply and exhaust passages.

10. The method of heating steel ingots which comprises assembling the ingots in a furnace chamber between fuel supply and waste gas ports of said chamber, the ingots being so disposed with reference to said ports that the distribution of the products of combustion is effected through sinuous paths from the bottom to the top, thence to the bottom of the furnace, and regulating the volume of fuel supply and the exhaust of the waste gases to thereby regulate the vertical extent of travel of the products of combustion to completely envelop the ingots with the heating medium.

11. The method of heating steel ingots in a closed furnace chamber having fuel supply and waste gas outlet ports at one end of the vertical axis of said chamber, which comprises standing the ingots on end on the furnace hearth and so placing them relative to the fuel and outlet ports that the products of combustion entering the furnace chamber are directed substantially parallel to and adjacent the walls of the ingots, and regulating the fuel supply and the exhaust of the waste gases to control the distribution of the products of combustion to completely envelop the ingots in the heated environment.

12. The method of heating steel ingots in a soaking pit furnace which comprises assembling the ingots on their ends in spaced relation on the furnace hearth, introducing combustible fuel mixtures into the furnace chamber on one side and at one end of the ingots, directing the products of combustion to the opposite end of the ingots with the flame axis out of contact with the ingot walls, and withdrawing the products of combustion at the opposite sides and at the end of initial application of heat to said ingots to thereby envelop the sides of the ingots with the heating medium.

13. A pit furnace for heating steel ingots comprising a hearth, side walls and roof structure constituting a heating chamber of sufficient depth for supporting a plurality of vertically disposed ingots on said hearth, said chamber having central and peripheral ports at the bottom thereof for the passage of a gaseous heating medium to generate a plurality of loops of hot gases extending across and communicating with said ports, the ports being spaced for assembling the vertically disposed ingots therebetween, said ingots to be enveloped on opposite sides by the loops of hot gases, and means controlling the fuel supply and the exit of the products of combustion through said ports to determine the magnitude of the ingot heating loops.

14. The method of heating steel ingots which comprises assembling the ingots on their ends between inlet and outlet ports on the hearth of a soaking pit furnace, introducing gaseous fuel into the furnace at the bottom on one side of the ingot walls, directing the products of combustion vertically upward parallel with the longitudinal axis of the ingots adjacent one side thereof, then downward to the outlet port at the bottom of the ingot adjacent the opposite side of the ingot, the major travel of the products of combustion being in a vertical plane, and controlling the volume of the fuel supply and exhaust gases passing through the ports to regulate the length of travel and heat intensity of the products of combustion.

15. In a steel ingot heating and soaking pit furnace, a hearth structure for supporting the ingots, a wall and roof structure forming with the hearth a furnace chamber of substantial depth, fuel supply and waste gas ports adjacent one end of the vertical axis of the furnace chamber, said ports being spaced to divide the chamber into contiguous firing zones in which the ingots are placed, and regulable means controlling the fuel supply and exit of the waste gases to extend the products of combustion vertically into and from the furnace chamber for enveloping one side of the ingots in travelling from end to end of said chamber, and to envelop the opposite sides of said ingots in their return travel to the waste gas outlets of the chamber.

16. The method of heating steel ingots which comprises, assembling a plurality of ingots on the hearth of a soaking pit in an upright position with the walls of the ingots forming a combustion space with the walls of the soaking pit, directing a heating medium from the bottom of the ingots along one side of said ingots to simultaneously heat all of said ingots and then directing the flow of the heating medium simultaneously to all of the opposite sides of said ingots to uniformly heat the said ingots.

17. The method of heating steel ingots in a soaking pit furnace which comprises assembling the ingots on their ends on the furnace hearth, introducing combustible fuel mixtures into the furnace chamber on one side of the ingots adjacent the bottom thereof, directing the products of combustion along one side from the bottom to the top of the ingots in such proximity therewith that the mean temperature differential of the heating flame and the ultimate ingot temperature shall be a minimum, and withdrawing the products of combustion from ports spaced and arranged adjacent the bottom of the furnace on the opposite sides of the ingots to envelop the ingots with the heating medium.

18. The method of heating steel ingots in a soaking pit furnace of substantial depth which comprises assembling the ingots on their ends in spaced relation on a furnace hearth with a wall of the ingots exposed to the fuel inlet of the furnace, and directing a heating medium vertically in a path parallel to the walls of the ingots and proximate thereto, whereby to maintain a minimum temperature differential of the heating flame and the ultimate ingot temperature.

19. The method of heating steel ingots in a soaking pit furnace having a combustion chamber of substantial depth, which comprises assembling the ingots on their ends in spaced relation on the furnace hearth and directing a heating flame and the products of combustion to and from the combustion chamber in paths substantially parallel to and coextensive with the walls of the ingots.

20. The method of heating steel ingots which comprises standing the ingots on their ends on the furnace hearth, directing a heating medium into one end of the furnace and withdrawing the products of combustion from the same end of the furnace on the opposite side of the ingots, the heating medium in passing into and out of the furnace traversing at least the full length of one longitudinal side of said ingots.

21. The method of heating steel ingots which comprises standing the ingots on their ends on the furnace hearth, directing a heating medium from the bottom into the furnace and withdrawing the products of combustion from the bottom of the furnace on the opposite side of the ingots, the heating medium in passing into and out of the furnace traversing at least the full length of one wall of said ingots.

22. The method of heating ingots which comprises assembling a plurality of ingots on a furnace hearth with one wall of all of said ingots exposed to a direct source of heat produced by combustion, and exhausting the products of combustion from the furnace to cause them to pass along substantially the full length of the walls of said ingots opposite the wall of direct heat application.

23. The method of heating steel ingots which comprises assembling ingots with their longitudinal axes substantially vertically disposed in a soaking pit furnace with one wall of the ingots exposed to a direct source of heat and the opposite walls of said ingots adjacent a heat reflecting wall of said furnace, and directing the products of combustion in one direction of their travel between the ingots and said heat deflecting wall.

24. The method of heating ingots in a pit furnace which comprises standing the ingots on their ends on a hearth to form a combustion chamber between a wall of the furnace and a perforate wall formed by the ingots, applying heat continuously at the bottom end of the ingots, flowing the heat unidirectionally from the firing port about the ingots while rising vertically, and then removing the waste heat continuously from the side of the ingots remote from the combustion chamber and substantially at the bottom end of the ingots.

25. The method of heating steel ingots which comprises standing the ingots on their ends on the furnace hearth, directing a heating medium from the bottom into the furnace and withdrawing the products of combustion from the bottom of the furnace, the heating medium in passing into and out of the furnace traversing at least the full length of one wall of said ingots.

26. The method of heating ingots in a soaking pit furnace having a heating chamber with a port for a gaseous heating medium in a horizontal wall of said chamber, which comprises, assembling the ingots in spaced relation on their ends on the hearth of said chamber to form a combustion space between the ingots, conducting a gaseous heating medium continuously from one end of the ingots, between the ingots, in a path substantially parallel to a wall of said ingots and spaced from the ingots sufficiently to produce substantially complete reaction of the combustible mixture before contacting with the ingots to prevent excessive contact of oxidizing gases with the walls of the ingots, and causing the heating medium to travel in a substantially vertical path extending to said port to thereby traverse at least the full length of one wall of said ingots.

WILLIAM A. MORTON.
HOWARD F. SPENCER.